(12) United States Patent
Jiang et al.

(10) Patent No.: US 9,448,057 B2
(45) Date of Patent: Sep. 20, 2016

(54) SURFACE CHARACTERISTIC DETERMINING APPARATUS

(75) Inventors: Xiangqian Jiang, Huddersfield (GB);
Kaiwei Wang, Huddersfield (GB);
Feng Gao, Huddersfield (GB); Hussam Muhamedsalih, Huddersfield (GB)

(73) Assignee: IBS Precision Engineering B.V., Eindhoven (NL)

( * ) Notice: Subject to any disclaimer, the term of this patent is extended or adjusted under 35 U.S.C. 154(b) by 543 days.

(21) Appl. No.: 13/144,859

(22) PCT Filed: Jan. 15, 2010

(86) PCT No.: PCT/GB2010/050063
§ 371 (c)(1),
(2), (4) Date: Oct. 3, 2011

(87) PCT Pub. No.: WO2010/082066
PCT Pub. Date: Jul. 22, 2010

(65) Prior Publication Data
US 2012/0026508 A1 Feb. 2, 2012

(30) Foreign Application Priority Data
Jan. 16, 2009 (GB) .................................. 0900705.5

(51) Int. Cl.
*G01B 11/02* (2006.01)
*G01B 9/02* (2006.01)
*G01B 11/24* (2006.01)

(52) U.S. Cl.
CPC ....... *G01B 9/02068* (2013.01); *G01B 9/02007* (2013.01); *G01B 9/0209* (2013.01);
(Continued)

(58) Field of Classification Search
CPC ..................... G01B 9/02064; G01B 9/02065
USPC ....................................................... 356/516
See application file for complete search history.

(56) References Cited

U.S. PATENT DOCUMENTS 5,377,003 A * 12/1994 Lewis et al. ................. 356/300
5,694,216 A 12/1997 Riza
(Continued)

FOREIGN PATENT DOCUMENTS

JP H1089912 A 4/1998
JP 2001-356272 A 12/2001
(Continued)

OTHER PUBLICATIONS

International Search Report from International Application No. PCT/GB12010/050063.
(Continued)

*Primary Examiner* — Tarifur Chowdhury
*Assistant Examiner* — Jonathon Cook
(74) *Attorney, Agent, or Firm* — Alson & Bird LLP

(57) ABSTRACT

A wavelength selector (5) selects a wavelength of a broadband light source (4). A light director (BS1, BS2) directs light from the wavelength selector along a measurement path towards a region of a sample surface and along a reference path towards a reference surface, such that light reflected by the region of the sample surface and light reflected by the reference surface interfere to produce an interferogram. A controller (20) controls the wavelength selector to change the wavelength selected by the wavelength selector. A recorder (63) records successive images, each image representing the interferogram produced by a respective one of the wavelengths selected by the wavelength selector. A data processor (18, 180) processes the recorded images to produce at least one of a surface profile and a surface height map of at least a part of the sample surface. The reference path may be controlled to compensate for environmental effects such as vibration, thermal effects and air turbulence. The data processor may use a graphics processing unit to enable pixel data to be processed in parallel.

19 Claims, 11 Drawing Sheets

(52) U.S. Cl.
CPC ....... *G01B9/02077* (2013.01); *G01B 9/02084* (2013.01); *G01B 11/2441* (2013.01); *G01B 2290/65* (2013.01)

(56) References Cited

U.S. PATENT DOCUMENTS

| | | |
|---|---|---|
| 6,433,929 B1 | 8/2002 | Sasaki |
| 2002/0196450 A1* | 12/2002 | Olszak et al. ................ 356/511 |
| 2005/0057756 A1 | 3/2005 | Fang-Yen |
| 2005/0083534 A1 | 4/2005 | Riza et al. |
| 2007/0024860 A1* | 2/2007 | Tobiason ........... G01B 9/02004 356/498 |
| 2009/0073456 A1* | 3/2009 | Wax .................. G01N 21/4795 356/479 |
| 2010/0220334 A1* | 9/2010 | Condit et al. ................ 356/497 |

FOREIGN PATENT DOCUMENTS

| | | |
|---|---|---|
| JP | 2003148921 A | 5/2003 |
| JP | 2005-017127 A | 1/2005 |
| JP | 2008145419 A | 6/2008 |
| WO | WO 92/19930 | 11/1992 |
| WO | WO 2007/144654 | 12/2007 |

OTHER PUBLICATIONS

Written Opinion of the International Searching Authority from International Application No. PCT/GB12010/050063.

Japan Patent Office, Office Action for Application No. 2011-545802, Nov. 6, 2013, 6 pages, Japan.

Daniel Malacara, "Optical Shop Testing: Chapter 14", Second Edition, 1992, John Wiley & Sons, Inc., ISBN 0-471-52232-5.

M. Takeda; H. Yamamoto: "Fourier-transform speckle profilometry: three-dimensional shape measurements of diffuse objects with large height steps and/or spatially isolated surfaces" Applied Optics vol. 33, No. 34, 1994, pp. 7829-7837.

J. Schwider; L. Zhou: "Dispersive interferometric profilometer" Opt. Lett. vol. 19, No. 13, 1994, pp. 995-997.

P. Sandoz; G. Tribillon; H. Perrin: "High-resolution profilometry by using phase calculation algorithms for spectroscopic analysis of white-light interefograms" J. Modern Opt. vol. 43, No. 4, 1996, pp. 701-708.

X. Dai; S. Katuo: "High-accuracy absolute distance measurement by means of wavelength scanning heterodyne interferometry" Meas. Sci. Technol. vol. 9, 1998, pp. 1031-1035.

Lin, D., et al., "High Stability Multiplexed Fibre Interferometer and its Application on Absolute Displacement Measurement and On-Line Surface Metrology," *Optics Express*, Nov. 15, 2004, pp. 5729-5734, vol. 12, No. 23.

* cited by examiner

SURFACE CHARACTERISTIC DETERMINING APPARATUS

This invention relates to surface characteristic determining apparatus.

Determination of surface characteristics such as height, form, waviness, and roughness is important in many areas of technology, not least for quality control and analysis in micro-scale and nano-scale manufacturing processes. The techniques used to measure surface characteristics divide into contact techniques such as the use of a transducer to determine the displacement of a pivotally or axially movable stylus as the stylus follows a surface to be characterised during relative movement between the stylus and the surface and non-contact techniques such as optical techniques, examples being interferometric techniques such as phase-shifting interferometry in which, as discussed in Chapter 14 of the second edition of "Optical Shop Testing" by Daniel Malacara (ISBN 0-471-52232-5), a series of interferograms are recorded as the reference phase of the interferometer is changed and a phase extraction algorithm is then used to determine the actual phase (which is related to the relative surface height), or white light or broadband scanning interferometry in which advantage is taken of the fact that the amplitude of the interference fringes produced with a spatially incoherent light source peaks at the position along the scan path of zero path difference between the sample surface and the reference surface and then falls off rapidly, so allowing a surface height profile to be determined by determining the position along the scan path of the coherence peak for different surface elements or surface pixels of the sample surface.

In developed economies the manufacture of high added value critical components is rapidly shifting to the design and fabrication of micro and nano structured and freeform surfaces. The market for components possessing these surfaces is huge and growing by 25% per year (1996-2005) and is receiving great investment worldwide.

The increasing use of nano scale and ultra-precision structured surfaces is wide ranging and covers the optics, silicon wafer, hard disks, MEMS/NEMS, micro-fluidics and micro-moulding industries. These industries all rely critically on ultra precision surfaces. There is however a fundamental limiting factor to the manufacture of such surfaces, namely the ability to measure the product quickly and easily within the manufacturing environment. It has been reported that currently the quality of fabrication depends largely on the experience of process engineers backed up by an expensive trial-and-error approach. Consequently many of these manufactured items suffer from scrap rates as high as 50-70%.

Optical interferometry has been widely explored for surface measurement due to the advantages of non-contact and high accuracy interrogation. However, conventional optical interferometry techniques are extremely sensitive to environmental noises such as mechanical vibration, air turbulence and temperature drift. These noises cause errors in surface measurement and can produce invalid results. There are a number of ways to try to reduce the effect of these noises. Although controlling the environment by using a vibration isolation stage and maintaining a fixed temperature is an effective way of reducing noise for laboratory and off-line applications, it may not be practical in the manufacturing situation, for example, when the target is too large to be mechanically isolated. Another method is to acquire the data as fast as possible by employing a high speed camera and fast phase shifting method, or even take all the required data simultaneously. Complete common-path interferometers such as the scatterplate interferometer are also insensitive to noise. However, these noise reduction methods are usually reserved for laser based phase shifting interferometry, which is limited to measurement of relatively smooth surfaces due to the well-known $2\pi$ phase ambiguity problem of monochromatic interferometry.

White-light or broadband vertical scanning interferometry (WLSI) can overcome the $2\pi$ phase ambiguity problem and so extend the field of application of interferometric profilometry to rough surfaces and structured surfaces with larger step heights. Vertical Scanning Interferometry (VSI) enables the absolute measurement of the optical path difference (OPD) by determining the peak position from the interferogram. However, the need to perform mechanical scanning of a heavy probe head or a specimen or sample stage limits the measurement speed. In addition, the data acquisition procedure and processing can be more complicated than monochromatic interferometry.

An aspect of the present invention provides apparatus for determining information relating to a sample surface, the apparatus comprising an optical spectral scanning interferometer and a data processor to determine surface topography measurement data based on phase shifts due to wavelength variations, thus avoiding or at least reducing any scanning by mechanical movement and enabling absolute optical path differences to be measured without any $2\pi$ phase ambiguity.

An aspect of the present invention provides apparatus for determining information relating to a sample surface, the apparatus comprising:
  a wavelength selector to select a wavelength of a broadband light source;
  a light director to direct light from the wavelength selector along a measurement path towards a region of a surface of a sample and along a reference path towards a reference surface such that light reflected by the region of the sample surface and light reflected by the reference surface interfere to produce an interferogram;
  a controller to control the wavelength selector to change the wavelength selected by the wavelength selector;
  a recorder to record successive images each image representing the interferogram produced by a respective one of the wavelengths selected by the wavelength selector; and
  a data processor to process the images recorded by the recorder to produce at least one of a surface profile and a surface height map of at least a part of the sample surface.

The apparatus may comprise a path controller to control at least the reference path length to compensate for phase variation due to environmental effects. The path controller may be arranged to move the reference surface to control at least the reference path length to compensate for phase variation due to environmental effects. The path controller may comprise the light director which is arranged also to direct light from a further light source along the measurement path towards the sample surface region and along the reference path towards the reference surface such that light from the further light source reflected by the region of the sample surface and by the reference surface interfere. The path controller may comprise a detector to detect interference produced by light from the further light source, a mover to move the reference surface and a mover controller to control the mover in accordance with an output of the detector. The further light source may comprise a coherent light source such as laser diode, for example a violet laser diode or a red light laser diode. The path controller may comprise a piezo-electric controller.

The wavelength selector may comprise an acousto-optic tuneable filter (AOTF), although other wavelength tunable devices could be used, for example a tuneable lase.

The light director may comprise more or more beam splitters, possibly dichroic beam splitters. The light director may comprise a Linnik interferometer.

The light director may provide a first interferometer for the broadband light source and a second interferometer for the further light source, the first and second interferometers sharing an optical path comprising at least part of the reference and measurement paths. The first and second interferometers may comprise Linnik interferometers, although other interferometer configurations may be possible.

An embodiment provides a surface measurement apparatus that uses an interferometer system having at least one Graphics Processing Unit (GPU) to process the interferograms to enable processing of pixel data in parallel.

The light source or sources may be remote from the rest of the apparatus, for example a fibre optic coupling may be used couple the light source or light sources to the light director.

The recorder may comprise an image sensor which may comprise a CCD or CMOS camera.

The data processor is arranged to process the interferograms to produce data representing the relative surface heights of a 1D or 2D array or sample of the surface pixels imaged by the recorder.

In an aspect, the present invention provides apparatus for determining information relating to a sample surface, the apparatus comprising:
   an measurement interferometer to direct light from a broadband light source along a measurement path towards a region of a surface of a sample and along a reference path towards a reference surface and to cause light reflected by the region of the sample surface and light reflected by the reference surface to interfere to produce an interferogram;
   a reference interferometer having a reference light source, the measurement and reference interferometers sharing a common optical path comprising at least part of the measurement and reference paths, the reference interferometer producing an output representing interference between light from the reference light source reflected by the sample surface and by the reference surface;
   a recorder to record successive images each image representing the interferogram produced by the sample surface;
   a data processor to process the images recorded by the recorder to produce at least one of a surface profile and a surface height map of at least a region of the sample surface;
   a detector to detect the output of the reference interferometer; and
   a path length controller to control a length of the reference path on the basis of the output detected by the detector.

The interferometers may comprise Linnik interferometers. The data processor may comprise at least one Graphics Processing Unit (GPU) to process the interferograms.

In an aspect, the present invention provides apparatus for determining information relating to a sample surface, the apparatus comprising an interferometric measurement system to produce interferogram image data sets, each data set comprising pixel image data for each of an array of surface pixels of the sample surface; and a data processor to process the interferograms to produce at least one of surface profile data and surface height map data of at least a part of the sample surface, the data processor comprising a graphics processing unit capable of processing the pixel data for different surface pixels in parallel.

In an aspect, the present invention provides interferometric measurement apparatus that uses a wavelength selectable broadband or white light interferometer, for example a Linnik interferometer, to obtain interferograms of a sample surface at different wavelengths from which surface height data for the sample surface can be obtained.

In an aspect, the present invention provides interferometric measurement apparatus that uses a broadband or white light measurement interferometer, for example a Linnik interferometer, to obtain interferograms of a sample surface from which surface height data for the sample surface can be obtained and a reference interferometer, for example a Linnik interferometer, to compensate for environmental noise such as vibration, thermal effects and/or air turbulence.

In an aspect, the present invention provides interferometric measurement apparatus that uses a broadband or white light measurement interferometer, for example a Linnik interferometer, to obtain interferograms of a sample surface from which surface height data for the sample surface can be obtained and a reference interferometer, for example a Linnik interferometer, sharing an optical path with the measurement interferometer to compensate for environmental noise such as vibration, thermal effects and/or air turbulence.

In an aspect, the present invention provides interferometric measurement apparatus that has: a broadband or white light measurement interferometer, for example a Linnik interferometer, to obtain interferograms of a sample surface from which surface height data for the sample surface can be obtained; a reference interferometer, for example a Linnik interferometer which reference interferometer may use a laser light source such as a laser diode, for example a violet laser diode, the reference interferometer sharing an optical path with the measurement interferometer; and a path length controller to compensate for environmental noise such as vibration, thermal effects and/or air turbulence by controlling at least one of a measurement path and a reference path of the measurement interferometer on the basis of an output of the reference interferometer. The broadband or white light measurement interferometer may be tuneable to enable interferograms to be produced at different wavelengths. A Graphics Processing Unit (GPU) may be used to process the interferograms.

In an aspect, the present invention provides interferometric measurement apparatus that has: a broadband or white light measurement interferometer, for example a Linnik interferometer, to obtain interferograms of a sample surface from which surface height data for the sample surface can be obtained; a reference interferometer, for example a Linnik interferometer (which reference interferometer may use a laser light source such as a laser diode, for example a violet laser diode), the reference interferometer sharing an optical path with the measurement interferometer; and a path length controller to compensate for environmental noise such as vibration, thermal effects and/or air turbulence by controlling the position of a reference surface of a reference path of the measurement interferometer on the basis of an output of the reference interferometer. The broadband or white light measurement interferometer may be tuneable to enable interferograms to be produced at different wavelengths. A Graphics Processing Unit (GPU) may be used to process the interferograms.

Aspects of the present invention include methods of using the apparatus.

As used herein "light" does not necessarily mean visible light. The light may be infra red or ultra violet light, for example. As used herein "beam" does not necessarily mean a continuous beam, it could be pulsed or otherwise vary in amplitude.

Embodiments of the present invention will now be described, by way of example, with reference to the accompanying drawings, in which.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these.

Figure 1A:
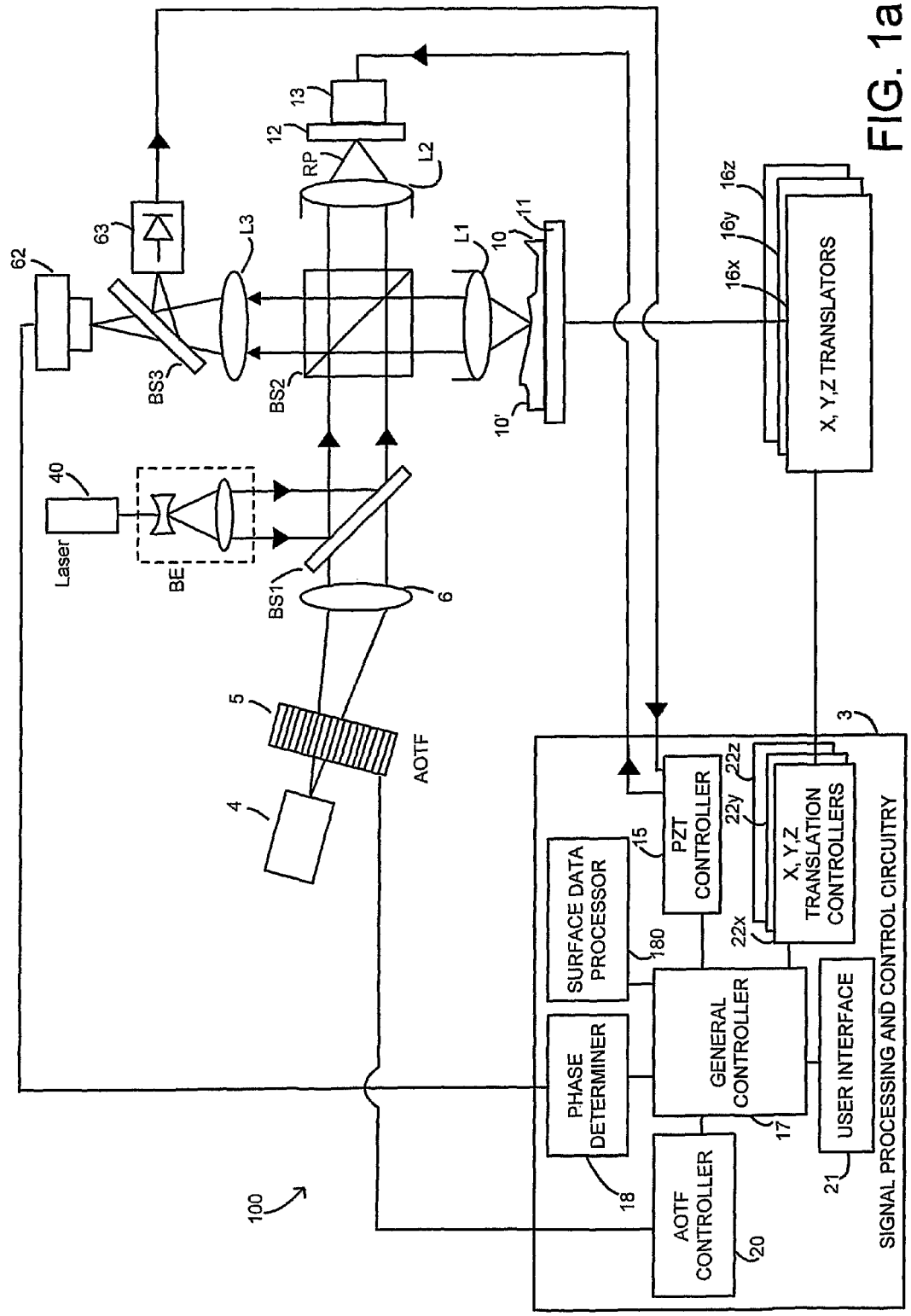
FIGS. 1a and 1b show functional diagrams of one example of a surface characteristic determining apparatus embodying the present invention.

FIG. 1a shows a functional diagram of a surface characteristic determining apparatus 100. The apparatus comprises two Linnik interferometers that share a common optical path and signal processing and control circuitry 3. One of the interferometers forms a measurement interferometer and the other forms a reference interferometer.

The measurement interferometer has a white light (or broadband) source 4 such as a halogen lamp and is used, as will be described below, to acquire a three dimensional surface profile of a sample. The reference interferometer has a laser light source 40 such as a violet laser diode and is used, as will be described below, to monitor and compensate for the environmental noise, for example temperature drift or variation, mechanical vibration and air turbulence.

Light from the white light source 4 is directed to an acousto-optic tuneable filter (AOTF) 5 that enables selection of a specific wavelength. Light output by the AOTF is directed to a first coupling element BS1 via a lens 6.

Figure 1B:
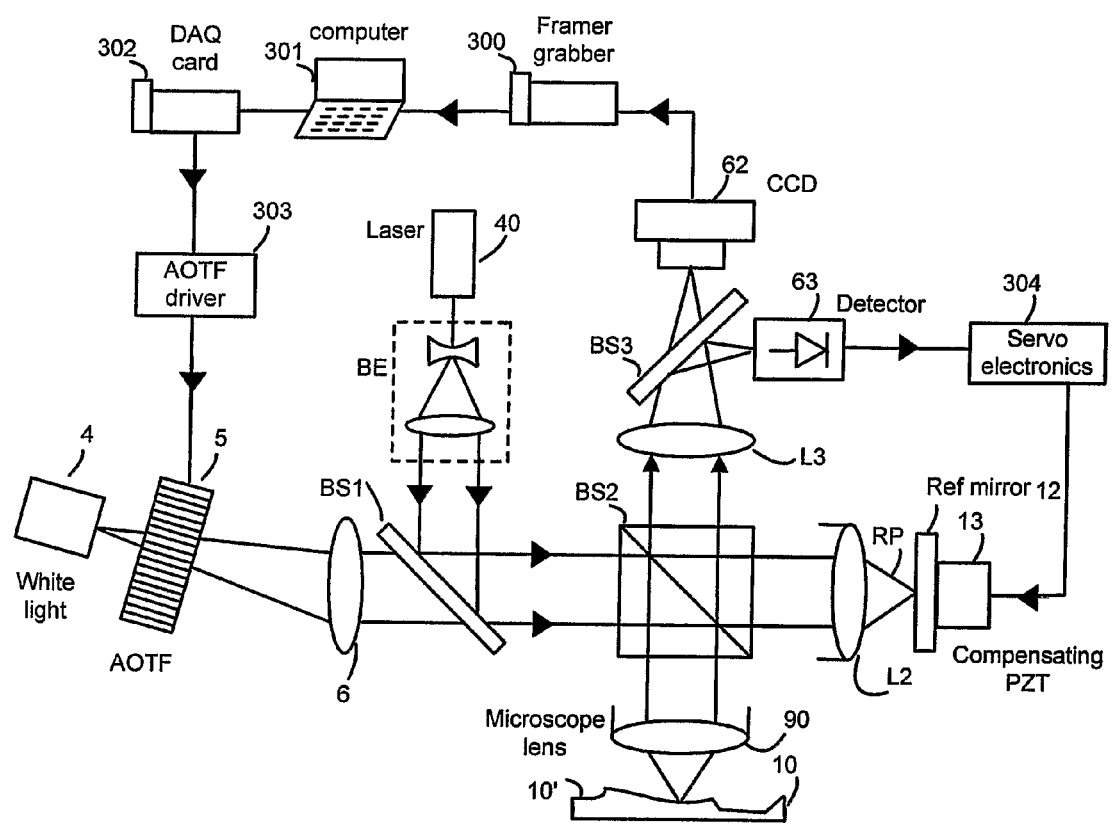

Light from the laser source 40 is directed to the coupling element BS1 via a beam expander BE. Any suitable form of beam expander may be used. As shown in FIGS. 1a and 1b, the beam expander BE comprises a diverging lens BE1 in series with a converging lens BE2.

The coupling element BS1 may, as shown in FIG. 1a, be a dielectric beam splitter BS1. As another possibility, the beam splitter may be a dichroic mirror that is highly reflective in the laser wavelength and transmissive in the visible light wavelength range, to enable as much light intensity as possible to be used. After passing through beam splitter BS1, the light beams are combined together.

Light is directed from the coupling element BS1 to a second coupling element BS2 which forms the beam splitter of each of the two interferometers. The system thus adopts a Linnik configuration in which the second coupling element BS2 acts as the beam splitter of both interferometers. The advantage of this configuration is its ability to compensate for chromatic dispersion and other optical aberrations.

The coupling element BS2 directs light along a reference path RP towards a reference surface, generally a reference mirror 12, and along a sample or measurement path SP towards a surface 10' of a sample 10 mounted on a sample support stage 11. Light directed along the sample path is focussed onto the sample surface 10' by objective lens L1 and light directed along the reference path is focussed onto the reference surface 12 by lens L2. Light reflected by the sample surface 10' returns along the sample path via lens L1 to the coupling element BS2 while light reflected by the reference surface 12 returns along the reference path via lens L2 to the coupling element BS2. The light reflected by the sample surface and the light reflected by the reference surface interfere to produce an interference signal or interferogram.

A third beam splitter BS3 directs the interference signal or interferogram from the measurement interferometer to a lens L3 which focusses the measurement interference signal or interferogram onto a sensor 62. In this example, the sensor is a two-dimensional image sensor comprising a two-dimensional array of sensing elements. The sensor may be a Charge Coupled Device (CCD) sensor or camera or could be a two-dimensional CMOS image sensor or camera.

The third beam splitter BS3 directs the interference signal or interferogram from the reference interferometer to a further optical sensor or detector 63. The optical detector 63 may be, for example, a PIN photodiode or other appropriate photosensitive semiconductor device.

The output of the optical sensor or detector 63 is supplied to a PZT controller 15 of the signal processing and control circuitry 3. A compensating piezoelectric translator (PZT) 13 attached to the reference mirror 12 is coupled to receive control signals from PZT controller 15 to enable the position of the reference mirror, and thus the length of the reference path, to be adjusted in accordance with the output of the optical detector 63.

The sample support stage 11 may be movable by at least one of X, Y and Z axis translators 16*x*, 16*y* and 16*z* to enable leveling of the sample surface and positioning of the sample support at the focus of the objective lens L1. At least one of the X and Y translators may be used to enable a different region of the sample surface to be brought into the field of view of the sensor 62 to enable a measurement to be carried out upon a different region of the sample surface.

As shown in FIG. 1*a*, the signal processing and control circuitry 3 has a general controller 17 to control overall operation of the signal processing and control circuitry 3, a phase determiner 18 to determine phase and thus surface height data, an AOTF controller 20 to control operation of the AOTF 5, and a user interface 21 to enable a user to interface with the apparatus to control its operation and to view the results of its operation. The signal processing and control circuitry 3 may have a surface data processor 180 to process data determined by the phase determiner 18 to enable a 2D surface profile or 3D surface height map to be produced.

Where the X, Y and Z axis translators 16*x*, 16*y* and 16*z* are provided, then the signal processing and control circuitry 3 will also have corresponding X, Y and Z axis translation controllers 22*x*, 22*y* and 22*z* which may be open-loop or closed-loop servo controllers.

The two Linnik interferometers and any translators 16*x*, 16*y*, 16*z* may be together be considered to form a metrological instrument so that the surface characteristic determining apparatus comprises the metrological instrument and the signal processing and control circuitry 3.

Figure 2:
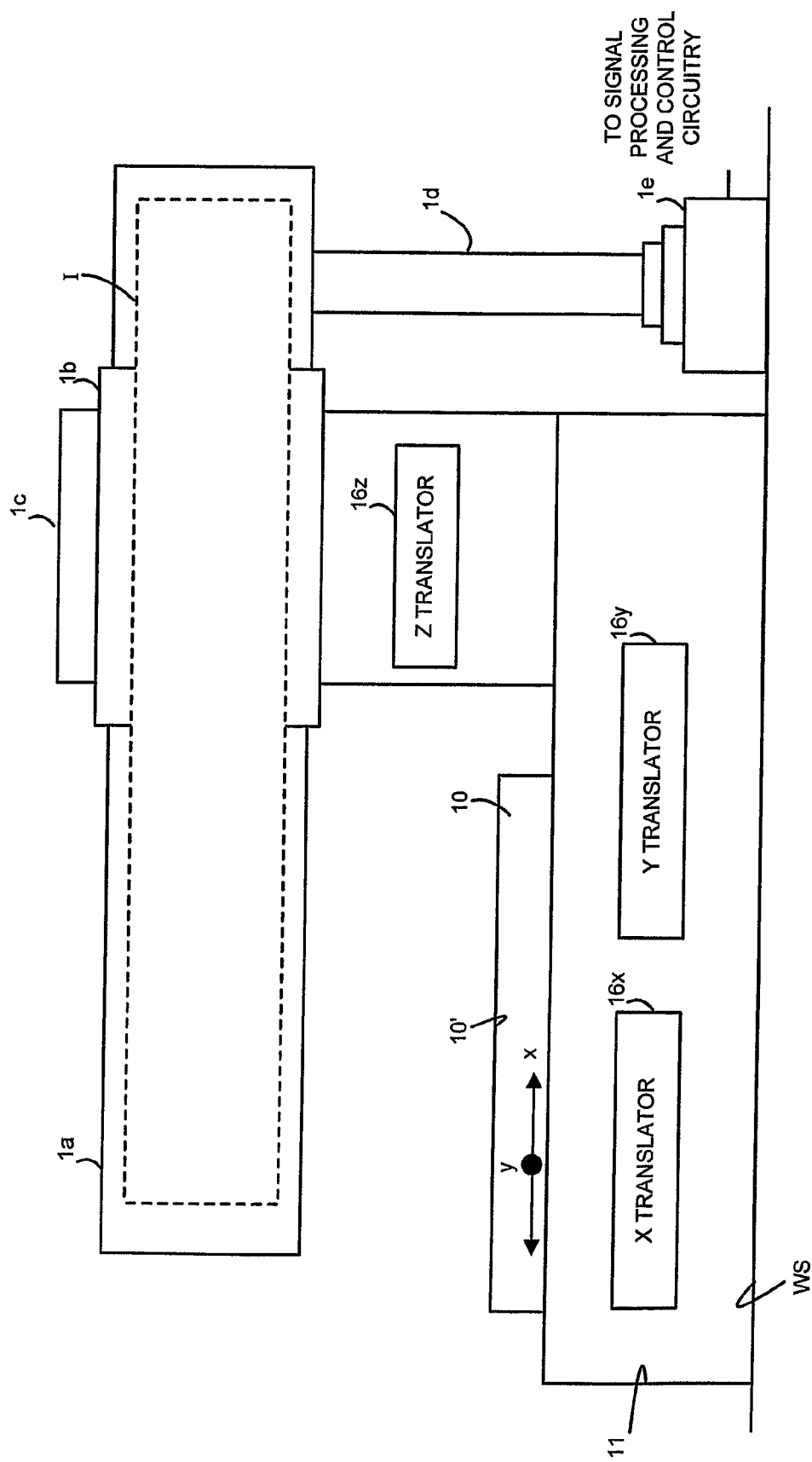
FIG. 2 shows a simplified side view of one example of a metrological instrument in the form of a surface characteristic determining apparatus, embodying the present invention.

FIG. 2 shows a simplified side view of one example of the metrological instrument in which a sample 10 is to be mounted on a sample support 11. As shown schematically by FIG. 2, in this example the interferometers I (shown simply by the dashed box in FIG. 2) are located within a housing 1*a* mounted via a carriage 1*b* to a Z-axis datum column 1*c*. Where the surface characteristic determining apparatus has a Z translator then the carriage 1*b* may coupled via a drive mechanism (not shown) such as a ball screw or lead screw drive mechanism to the Z translator 16*z*. The Z translator 16*z* may be in the form of a manually operable control or, for example, a DC motor that enables the carriage 1*b* and thus the measurement head 1 to be moved up and down the column 1*c* in the Z direction.

Where the X and Y translators 16*x* and 16*y* are present, then, as shown in FIG. 2, they may be housed in the sample support stage 11. The X and Y translators 16*x* and 16*y* may be in this example DC motors coupled to the sample support stage 11 by appropriate conventional drive mechanisms such as rack and pinion or ball screw drive mechanisms (not shown).

The signal processing and control circuitry 3 may at least partially be implemented by programming computing apparatus, for example a personal computer. Thus, some components of the signal processing and control circuitry may be provided by software, some by hardware, some by firmware and so on, depending upon the particular system requirements. Where fast processing is required then one or more DSPs may be used and/or one or more graphics processing units (GPUs) may be used to enable parallel processing of pixel data.

Figure 3:
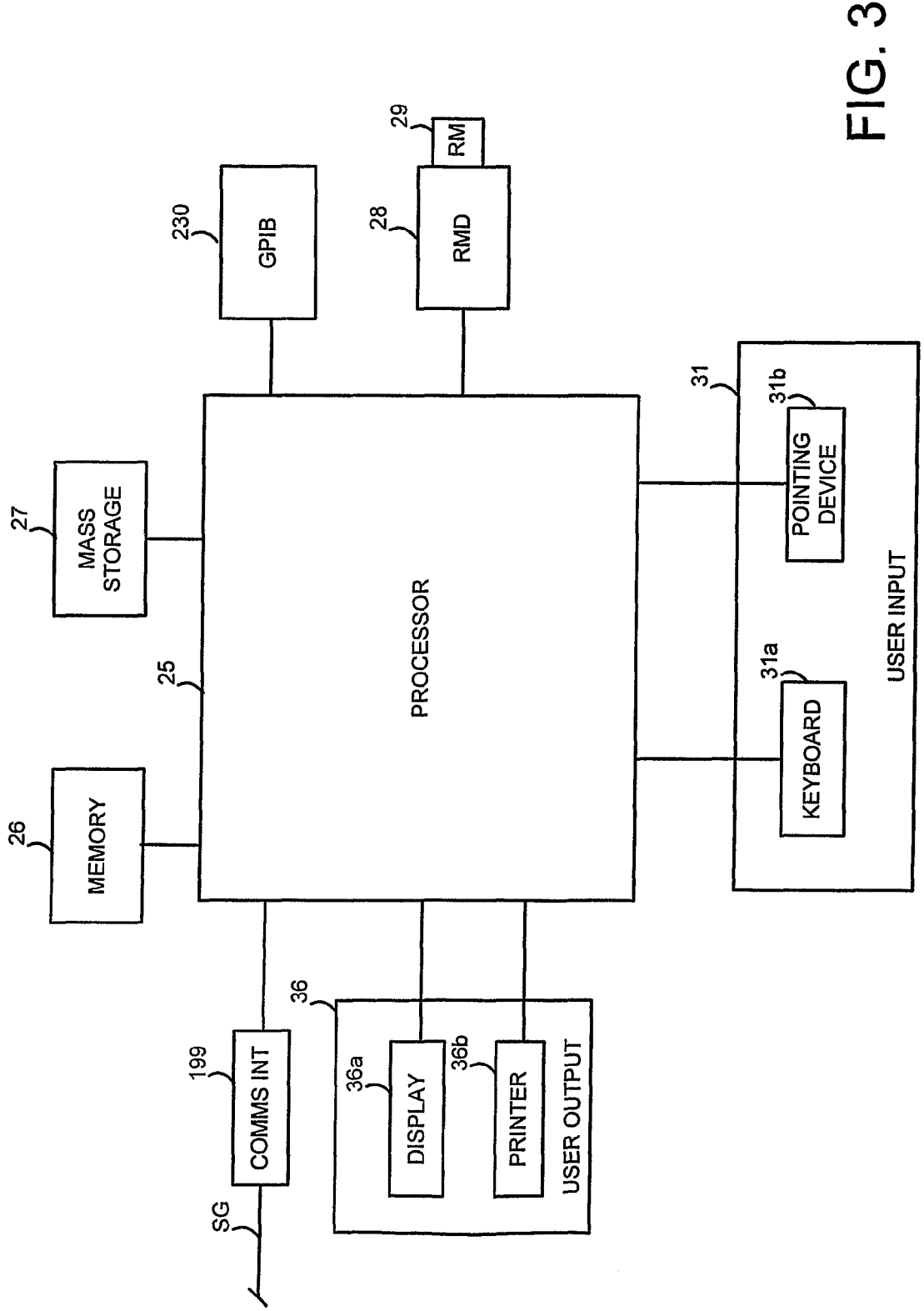
FIG. 3 shows a block diagram of processing apparatus that may be programmed by computer program instructions to provide signal processing and control circuitry of a surface characteristic determining apparatus embodying the present invention.

FIG. 3 shows a simplified block diagram of such computing apparatus which may be a PC or other general purpose computing apparatus, for example. As shown, the computing apparatus has a processor 25 associated with memory 26 (ROM and/or RAM), a mass storage device 27 such as a hard disk drive, a removable medium drive (RMD) 28 for receiving a removable medium (RM) 29 such as a floppy disk, CDROM, DVD or the like, input and output (I/O) control circuitry, for example in the form of a general purpose interface bus (GPIB) card 2300, or a NI DAQ card, for interfacing with components such as the AOTF controller, the PZT controller and the X, Y and Z translation controllers, if present, to enable the processor 25 to control operation of these components and to provide precise fast phase determination and measurement.

In this example, the user interface 21 consists of a user input 31 having, in this example of a keyboard 31*a* and a pointing device 31*b*, and a user output 36 consisting, in this example, of a display such as a CRT or LCD display 36*a* and a printer 36*b*. The computing apparatus may also include a communications interface (COMMS INT) 199 such as a modem or network card that enables the computing apparatus to communicate with other computing apparatus over a network such as a local area network (LAN), wide area network (WAN), an Intranet or the Internet.

The processor 25 may be programmed to provide required functionality by, for example, any one or more of the following ways:
1. by pre-installing program instructions and any associated data in a non-volatile portion of the memory 26 or on the mass storage device 27;
2. by downloading program instructions and any associated data from a removable medium 29 received within the removable medium drive 28;
3. by downloading program instructions and any associated data as a signal SG supplied from another computing apparatus via the communications interface 199; and
4. by using the user input of the user interface.

The computing apparatus, when programmed by program instructions, enables a measurement operation to be controlled in accordance with instructions received by a user via the user interface and allows the measurement results to be analyzed and the results of the analysis displayed to the user as discussed above.

In operation of the surface characteristic determination apparatus described above, the AOTF controller 20 controls the acousto-optic tuneable filter (AOTF) 5 to select the wavelength of the light output by the AOTF and an interferogram is recorded by the sensor 62 for each different wavelength selected by the AOTF controller. These "different wavelength" interferograms are then analyzed by the phase determiner 18 to determine a surface height (phase) for each surface pixel of the region surface imaged by the sensor 62. The change in determined surface height in one or more directions across that surface region may be determined by the surface data processor 180 to provide surface profiles which may be displayed to a user by the user interface. Similarly, the surface data processor 180 may use the determined surface height data to produce a 3D or areal surface height map which may be displayed to a user by the user interface. Without the reference interferometer and the servo loop provided by the detector 63, PZT 13 and PZT controller 15 and reference surface 12 feed back loop, environmental noise such as vibration, for example mechanical vibration, air turbulence and/or thermal effects such as temperature drift or variation may cause the measurement and/or reference paths to vary and so result in inaccurate measurement. However, in this apparatus, the servo loop acts to move the reference mirror or surface 12 in accordance with the output of the detector 63 to phase-lock the reference interferometer to compensate for environmental noise before each measurement. The servo loop may be configured to phase-lock the reference interferometer at around quadrature to maximize sensitivity to environmental disturbance. It will be appreciated that the speed of response of the PZT should be more rapid than the frequency of any environmental noise, that the frequency of any environmental noise will be higher than the frequency at which the AOTF controller changes the output wavelength of the AOTF and that the time taken for the sensor 62 to capture an interferogram will be short compared to any environmental noise variations, so that phase-locking can be achieved and the path lengths stabilized against environmental noise for each measurement.

The reference interferometer and its servo loop thus should enable compensation for any environmentally induced noise. Floor vibration tends to occur in the range of 20 to 200 Hz whilst modern PZTs have a resolution up to 0.05 nm and a frequency response of 35 kHz (for example the P-249.10 supplied by PI (Physik Instrumente) Ltd of Cranfield, Bedford, England, UK) so that the environmental noise compensation can be very quick and accurate provided that the load is light.

FIG. 1*b* shows an implementation of the surface characteristic determining apparatus 100 in which the signal processing and control circuitry 3 is provided by a framer grabber 300, a personal computer 301, a data acquisition (DAQ) card 302, AOTF driver 303 and servo electronics 304. The personal computer has a data store storing software which together with the framer grabber 300, data acquisition (DAQ) card 302, AOTF driver 303 and servo electronics 304 provide the functionality shown in FIG. 1*a* so that the frame grabber and personal computer software correspond to the phase determiner 18 of FIG. 1*a*, the data acquisition (DAQ) card 320 and AOTF driver 303 correspond to the AOTF controller 20 of FIG. 1*a* and the servo electronics correspond to the PZT controller 15 of FIG. 1*a* whilst personal computer software corresponds to the surface data processor of FIG. 1*a*. The personal computer of course provides a user interface corresponding to that of FIG. 3.

As above, in this example the measurement interferometer, illuminated by the white light or broadband source, is used to acquire a three-dimensional surface profile of the sample. The reference interferometer, illuminated by the laser source 40, is used to monitor and compensate for the environmental noise, e.g. temperature drift, mechanical vibration and air turbulence. This is achieved by use of the PZT controller 15 (servo electronics 304 in FIG. 1*b*) which adjusts the position of the reference surface 12 to compensate for environmental noise. As the two interferometers suffer similar environmental noise (due their common path), the measurement interferometer will be capable of measuring surface information once the reference interferometer is phase-locked into an environmental noise compensation mode.

The light beams from the white light and the laser sources 4 and 40 are coupled by the coupling element BS1. As mentioned above, the coupling element BS1 may be a dielectric beam splitter or, to utilize as much light intensities as possible, may be a dichroic mirror that is highly reflective in the laser wavelength and transmissive in the visible light wavelength range. After passing through beam splitter BS1, the light beams are combined together.

The apparatus adopts a Linnik configuration in which BS2 acts as the beam splitter. The advantage of this configuration is its ability to compensate for chromatic dispersion and other optical aberrations. Light reflected by the sample surface 10' and the reference surface or mirror 12 are combined by beam splitter BS2 to generate an interferogram.

The acousto-optic tuneable filter (AOTF) 5 placed after the white light source 4 is controlled by the AOTF driver 303 to select specific wavelengths in turn thus producing a set of interferograms at the sensor 62, each of which interferograms is sourced only by its specific wavelength. The selected light wavelength is determined by:

$$\lambda = \Delta n \alpha \frac{v_a}{f_a} \quad (1)$$

where $\Delta n$ is the birefringence of the crystal used as the diffraction material of the AOTF 5, $\alpha$ is a complex parameter depending on the design of the AOTF, $v_a$ and $f_a$ are the propagation velocity and frequency of the acoustic wave, respectively. The wavelength of the light that is selected by this diffraction can therefore be varied simply by the AOTF controller changing the AOTF driving frequency $f_a$. The AOTF controller allows different wavelengths of light to pass through the AOTF in sequence so that a series of interferograms at these different wavelengths are detected by the sensor. The absolute optical path difference (and thus the relative surface height of each surface pixel of the surface region imaged by the sensor 62) can be calculated by analyzing these interferograms as discussed below Current AOTFs have a typical resolution of 1 nm to 10 nm which is determined by design parameters. This results in a coherence length of about 30-400 μm for the diffracted light. No interferogram will be detected when the optical path difference of the measurement interferometer is larger than the coherence length. The particular AOTF used in an experimental embodiment, restricts the vertical measuring range of this technique to approximately 200 μm. Greater vertical measurement ranges may be possible with other AOTFs, or a tuneable laser.

As discussed above, surface measurement in the workshop/manufacturing environment has been difficult to achieve using interferometric methods because they are so sensitive to vibrations, in particular, axial (vertical) vibration. In addition, measurement noise can also be induced by temperature drift and air turbulence. In the apparatus described above, a reference interferometer illuminated by a single wavelength laser is employed together with a servo feedback to effectively compensate for the environmental noise. Light output from the laser is combined with the measurement light and travels almost the same optical path as the measurement interferometer. The interference signal of the reference interferometer is acquired by the sensor or detector 63 after being filtered off by the beam splitter BS3. As a result of the shared optical path of the measurement and reference interferometers, if the noise occurring in the reference interferometer is monitored and compensated for, the measurement interferometer will 'see' no noise during measurement. The compensating piezoelectric translator (PZT) 13 attached to the reference mirror 12 is driven by the servo electronics 304 (or PZT controller 15) and is used to compensate for any environmentally induced noise. Thus, the PZT controller feeds to the PZT 13 a control voltage which is dependent upon the output of the detector 63, thereby causing the reference mirror 12 to move to cause an optical path change that opposes any optical path change resulting from environmental disturbance. In this way, the environmental noise in the measurement interferometer is compensated for. The reference interferometer will be phase-locked at around quadrature to maximize sensitivity to environmental disturbance. Most normal floor vibration occurs in the range of 20 to 200 Hz. Modern PZTs have a resolution up to 0.05 nm and a frequency response of 35 kHz (for example the P-249.10 supplied by PI (Physik Instrumente) Ltd of Cranfield, Bedford, England, UK), the noise compensation can be very quick and accurate provided that the load is light.

Phase Calculation

The light intensity detected by a sensing element or pixel (x,y) of the sensor 62 (CCD camera in an example) corresponding to one point (the surface pixel or area of the sample surface from which that sensing element accepts light) of the test or sample surface can be expressed by $$I(x,y;k)=a(x,y;k)+b(x,y;k)\cos(2\pi kh(x,y)) \quad (2)$$

where $a(x,y;k)$ and $b(x,y;k)$ are the background intensity and fringe visibility respectively, k is the wavenumber which is the reciprocal of wavelength, and $h(x,y)$ is the absolute optical path difference of the interferometer.

The phase of the interference signal, $\phi(x,y;k)$ is given by $$\phi(x,y;k)=2\pi kh(x,y) \quad (3)$$

The phase shift of the interference signal owing to the wavenumber shift is given by $$\Delta\phi(x,y;\Delta k)=2\pi\Delta kh(x,y) \quad (4)$$

The phase change of the interference signal is proportional to the wavenumber k change. Then, the optical path difference $h(x,y)$ is given by $$h(x, y) = \frac{\Delta\varphi(x, y, \Delta k)}{2\pi\Delta k} \quad (5)$$

The change of k can be calibrated first by using an optical spectral analyzer. There are many phase calculation methods that may be employed by the phase determiner 18. These algorithms include: phase demodulation using a lock-in amplifier for example as described in X. Dai, and S. Katuo, "High-accuracy absolute distance measurement by means of wavelength scanning heterodyne interferometry," Meas. Sci. Technol. 9, 1031-1035 (1998), the whole contents of which are hereby incorporated by reference; phase calculation by a seven-point method used in classical phase shifting interferometry for example as described in P. Sandoz, G. Tribillon, H. Perrin, "High-resolution profilometry by using phase calculation algorithms for spectroscopic analysis of white-light interferograms," J. Modern Opt. 43(4), 701-708 (1996), the whole contents of which are hereby incorporated by reference; extremum position counting for example as described J. Schwider, L. Zhou, "Dispersive interferometric profilometer," Opt. Lett. 19(13), 995-997 (1994) the whole contents of which are hereby incorporated by reference; and Fourier transform based techniques for example as described in M. Takeda, H. Yamamoto, "Fourier-transform speckle profilometry: three-dimensional shape measurements of diffuse objects with large height steps and/or spatially isolated surfaces," Applied Optics 33(34), 7829-7837, the whole contents of which are hereby incorporated by reference.

In this example, the phase determiner 18 uses phase calculation by Fourier transform because it is fast, accurate and insensitive to intensity noise. However any of the other above approaches or other suitable techniques may be used.

In equation 2, as mentioned, a $(x,y;k)$ and $b(x,y;k)$ are slowly variable with respect of k due to the spectrum intensity of the light source and the response of the sensor 62. Practically, the path difference of the interferometer is adjusted to be large enough so that the frequency of the cosine term is higher than the variation frequency of term a $(x,y;k)$ and $b(x,y;k)$ so that they can be easily separated from each other. Equation (2) may be rewritten as $$I(x,y;k)=a(x,y;k)+\tfrac{1}{2}b(x,y;k)\exp[2\pi ikh(x,y)]+\tfrac{1}{2}b(x,y;k)\exp[-2\pi ikh(x,y)] \quad (6)$$

The Fourier transform of equation (6) with respect to k can then be written as $$\hat{I}(x,y;\xi)=A(x,y;\xi)+B(x,y;\xi-h(x,y)+B(x,y;\xi+h(xy)) \quad (7)$$

where the uppercase letters denote the Fourier spectra of the signal expressed by the corresponding lower-case letters. If h $(x,y)$ is chosen to be higher than the variation of $a(x,y;k)$ and $b(x,y;k)$, the three spectra can be separated from one another. To retrieve the phase distribution of the fringe, the term $B(x,y;\xi-h(x,y))$ is selected and thus the background intensities a $(x,y;k)$ is filtered out. The inverse Fourier transform of $B(x,y;\xi-h(x,y))$ is $$IFFT(B(x,y;\xi-h(x,y)))=\tfrac{1}{2}b(x,y;k)\exp[2\pi ikh(x,y)] \quad (8)$$

Taking the natural logarithm of this signal yields, $$\log\{\tfrac{1}{2}b(x,y;k)\exp[2\pi ikh(x,y)]\}=\log[\tfrac{1}{2}b(x,y;k)]+i\phi(x,y;k) \quad (9)$$

from which imaginary part of equation (9) is precisely the phase distribution to be measured. Following the above procedures, the phase determiner 18 can determine the phase distribution (that is the phase distribution across the series of different wavelength measurement interferograms) for each sensor pixel (each of which corresponds to a surface pixel of the sample surface) and the surface data processor 180 can thus determine a surface profile and/or surface height map of the region of the surface sensed by the sensor. Since the main operation here is FFT and IFFT, the data processing is fairly fast. Different regions of a sample surface may be measured by use of the X and Y translators to reposition the sample relative to the sensor 62. Where the X and Y translators discussed above are available so that different regions of the surface may be sensed by the sensor 62, the surface data processor may use a stitching algorithm to combine surface measurement data from different regions of a sample into a larger surface height profile and/or map.

Measurement Results

Figure 4A:
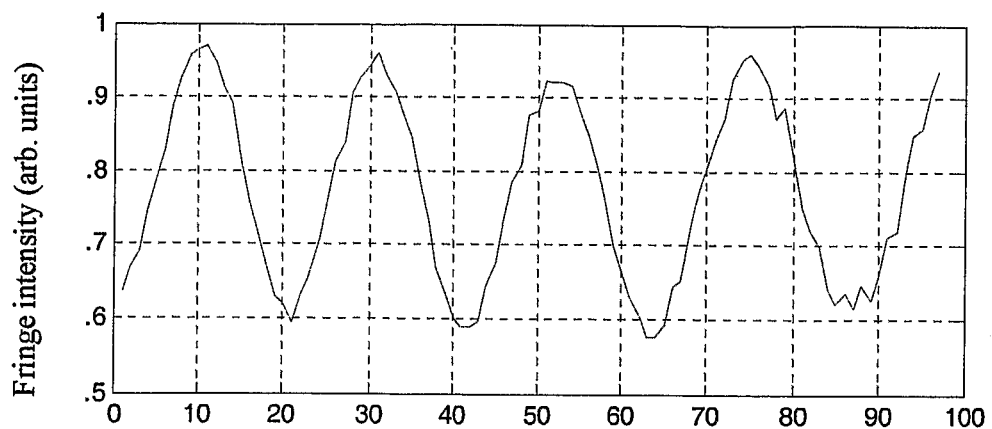
FIG. 4a shows the intensity distribution recorded by a pixel (sensing element) of a sensor of apparatus embodying the invention whilst
Figure 4B:
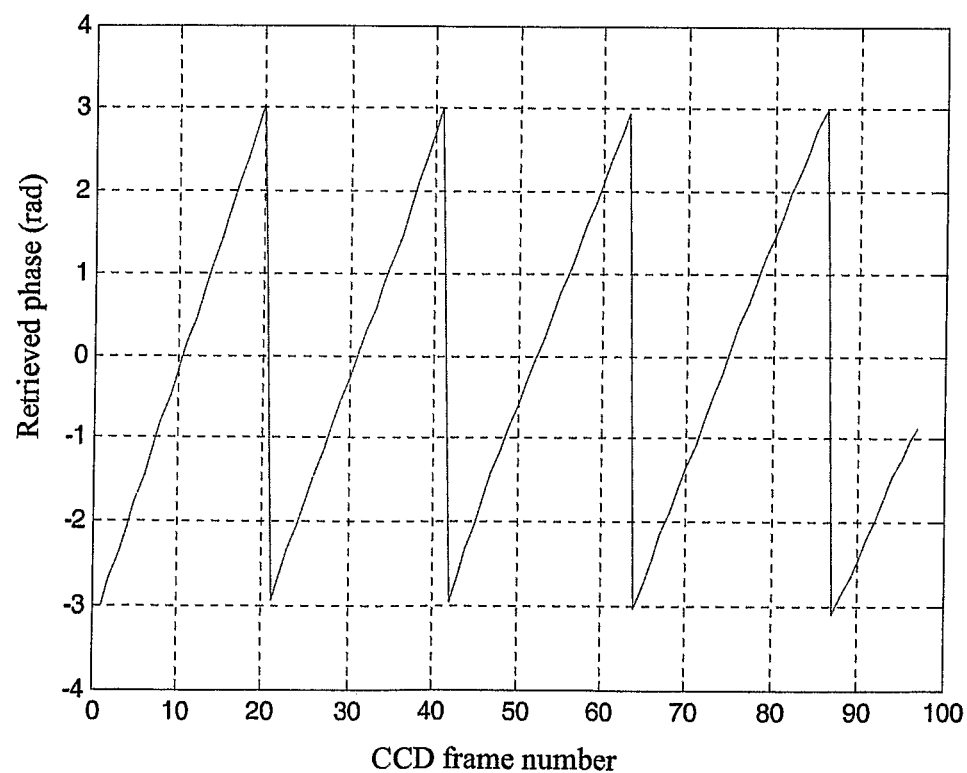
FIG. 4b shows the corresponding retrieved phase distribution.

The method described above was used to measure two standard height specimens. In the experiment, the radio frequency applied to the AOTF (in this example Model LSGDN-1, supplied by SIPAT Co. of Chongqing, China) was scanned from 80 MHz to 110 MHz in steps of 10 kHz, corresponding to a wavelength interval of 0.48 nm. At the same time, the interferograms were recorded by a high speed CCD camera (in this example Model OK-AM1131, Join-Hope Image Tech. Ltd.) at a frame rate of 100 frames/s. FIG. 4a shows the intensity distribution recorded by one of the CCD pixels and FIG. 4b the corresponding retrieved phase, as determined by the data processing procedure described by equations (7-9).

Figure 5A:
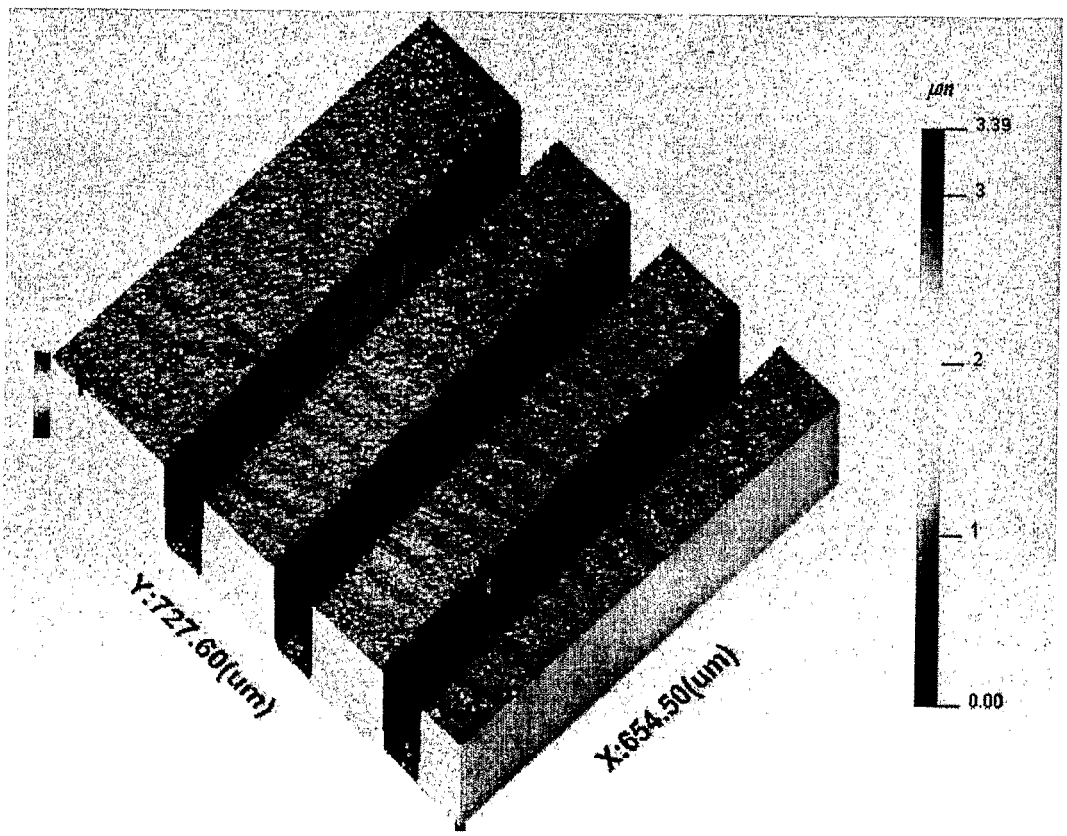
FIG. 5a shows an areal surface or 3D view of measurement results obtained by using apparatus embodying the invention to measure a 2.97 µm standard step sample whilst
Figure 5B:
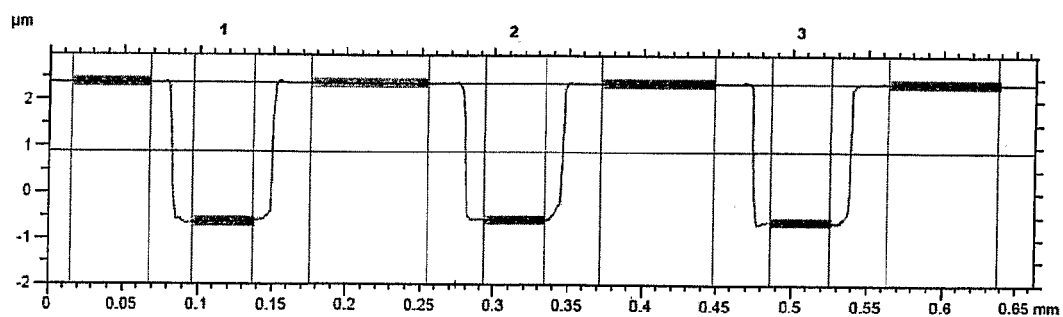
FIG. 5b shows a cross-section profile resulting from the measurements on that sample.

FIG. 5(a) shows an areal surface view of the results of similar measurements made on a 2.970 µm step height standard as supplied by National Physical Laboratory (NPL), UK. Clearly there are three grooves in sample surface. FIG. 5(b) shows a determined surface profile or sectional view of the measured grooves. The measured average step height is 2.971 µm. The measurement error is 1 nm.

Figure 6A:
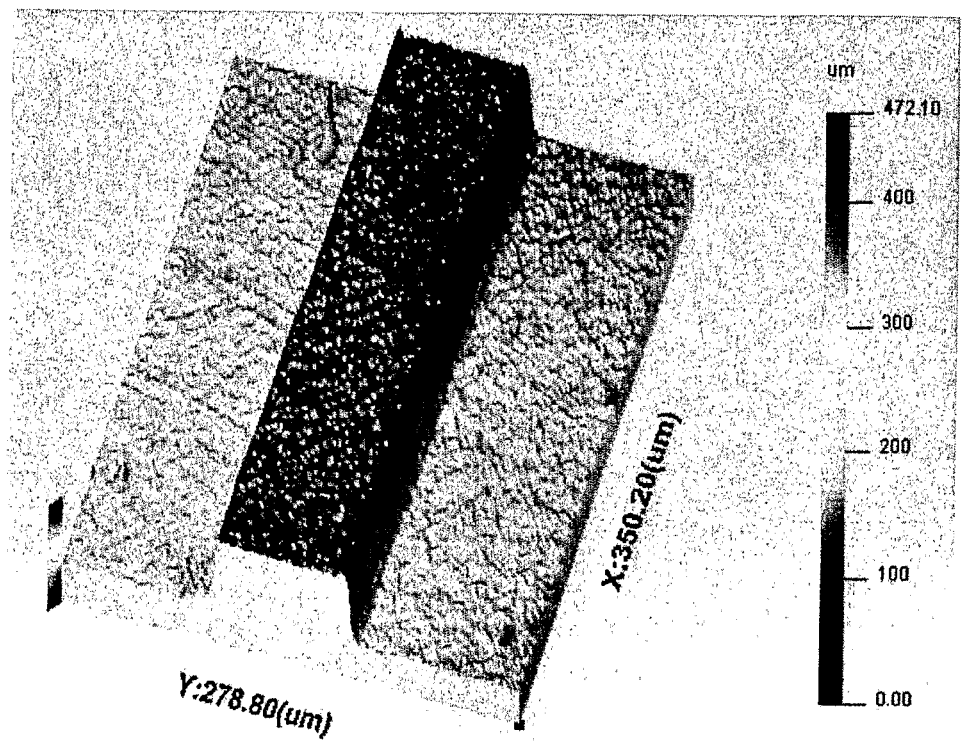
FIG. 6a shows an areal surface or 3D view of measurement results obtained by using apparatus embodying the invention to measure a 292 nm step height standard sample whilst
Figure 6B:
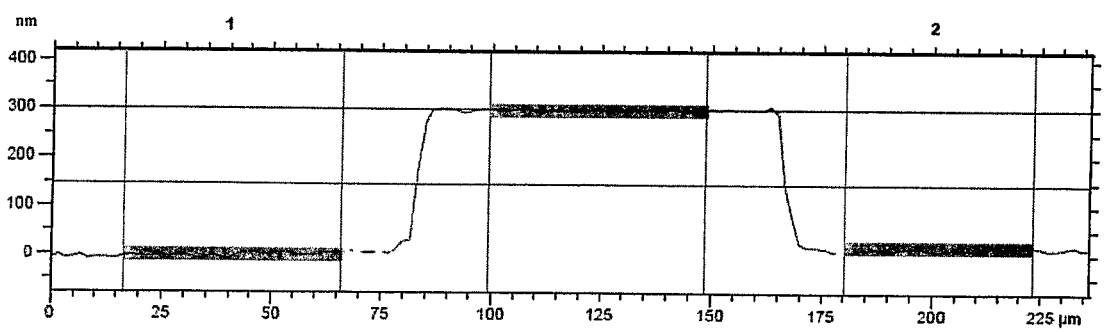
FIG. 6b shows a cross-section profile resulting from the measurement on that sample.

FIG. 6(a) shows an areal surface view of the results of a similar measurement on a 292 nm standard specimen, as calibrated by Physikalisch-Technische Bundesanstalt (PTB) whilst FIG. 6(b) shows the corresponding sectional view or profile of the step. The measured average step height is 291.1 nm. The measurement error is 0.9 nm.

Figure 7A:
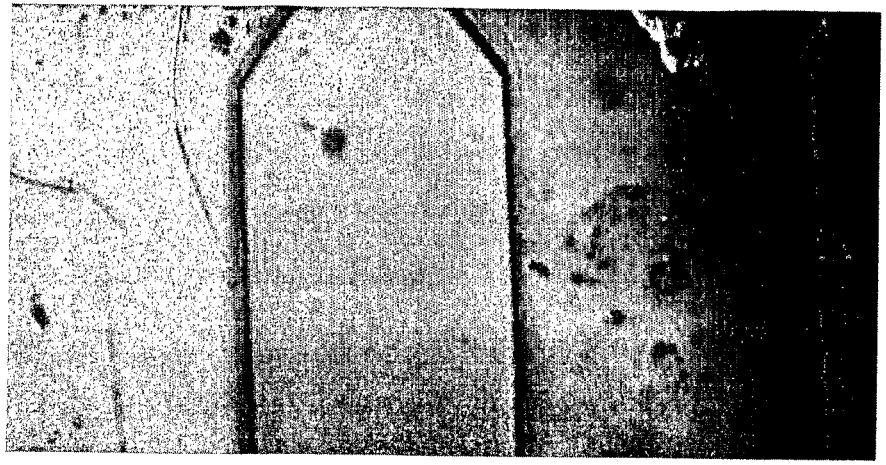
FIG. 7a shows a camera photograph of the surface of an electro-optic hybrid chip sample whilst
Figure 7B:
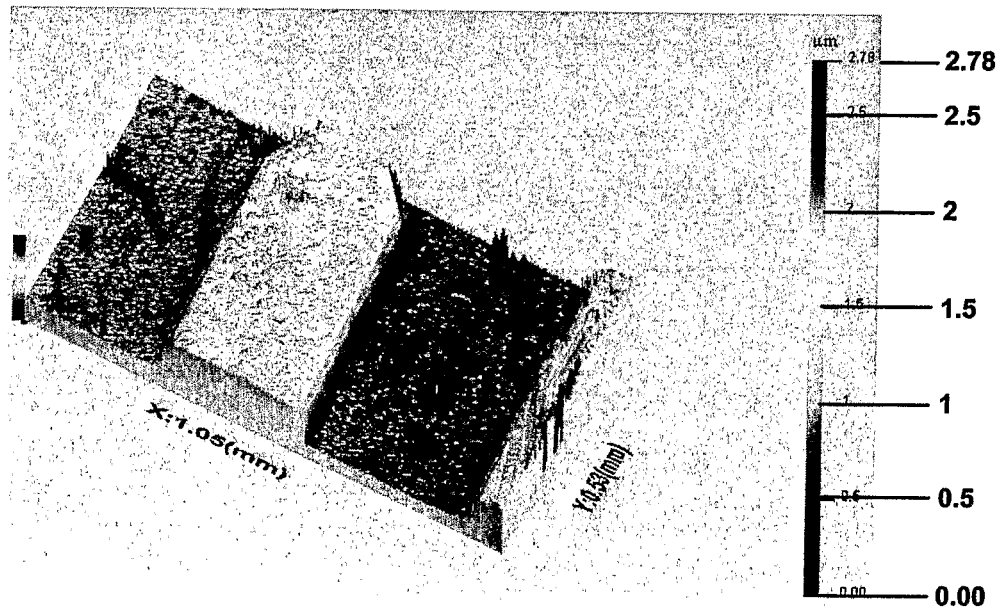
FIG. 7b shows an areal surface or 3D view of measurement results obtained for that sample using apparatus embodying the invention.
Figure 8A:
FIG. 8a shows a camera photograph of the surface of a silica wafer sample whilst
Figure 8B:
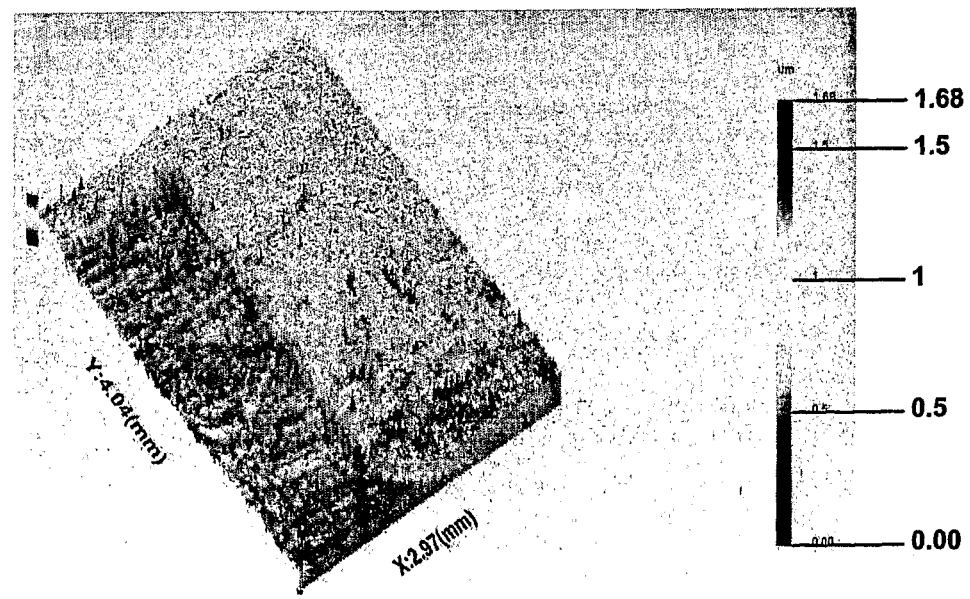
FIG. 8b shows an areal surface or 3D view of measurement results obtained for that sample using apparatus embodying the invention.

The described apparatus was also used to measure an electro-optic hybrid chip and a silica wafer. The measurement results of these two samples are shown in FIG. 7a and FIG. 8b, respectively. Camera photos (FIG. 7a and FIG. 8a) are also presented for each sample to facilitate comparison. It can be seen by comparing the photos and the measurement results (FIG. 7b) and FIG. 8b) that steps and minor scratches are clearly measured and revealed in detail.

Figure 9:
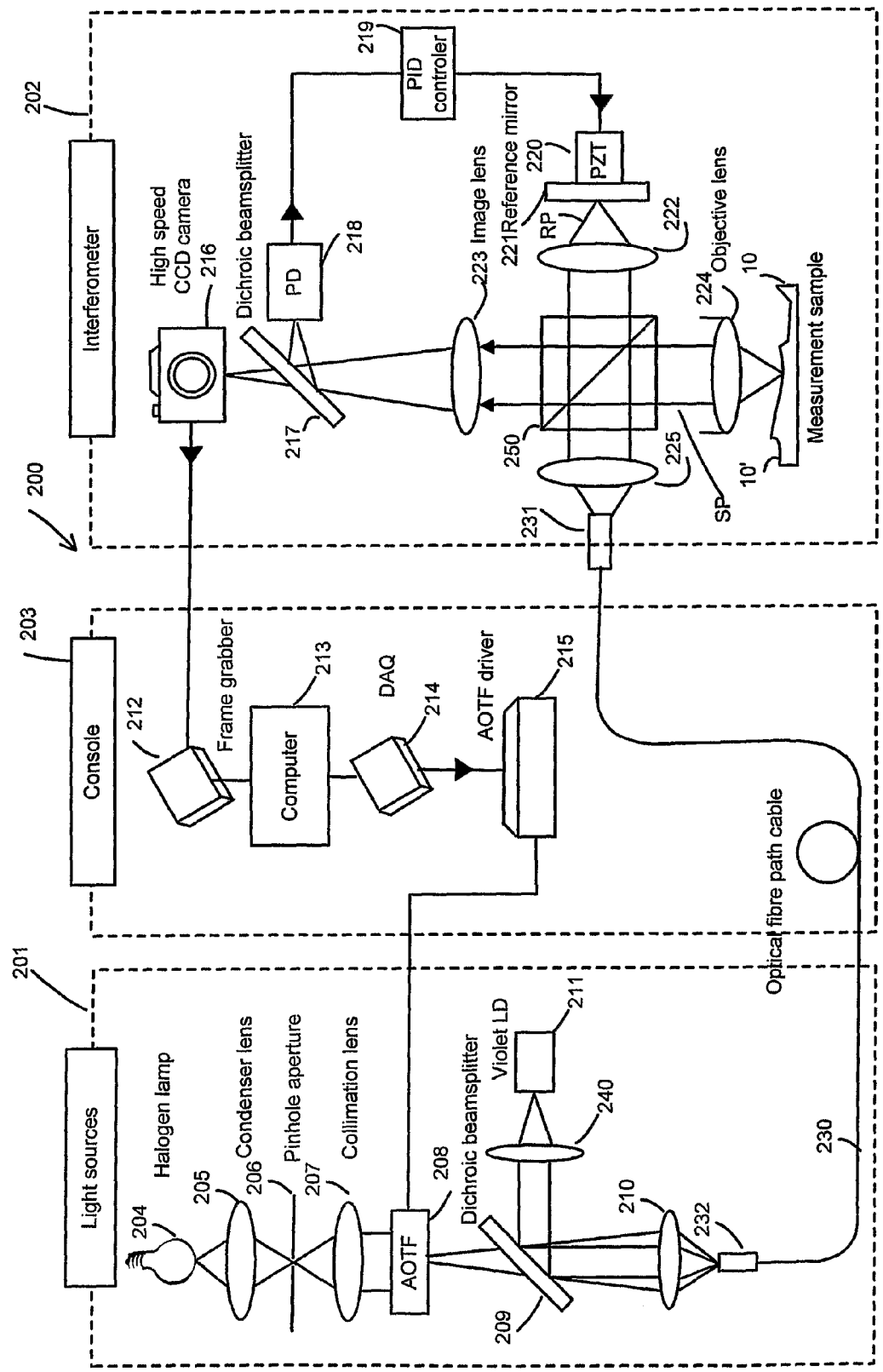
FIG. 9 shows a functional diagram of another example of a surface characteristic determining apparatus embodying the present invention.

Another example of a surface characteristic determining apparatus 200 employing spectral scanning interferometry for fast surface measurement is illustrated by FIG. 9.

The apparatus 200 has three sections:
1) a light source section 201
2) an Interferometer section 202
3) a control section 203.

The Interferometer section 202 provides a measurement interferometer having a white light (or broadband) source 204 such as a halogen lamp. The reference interferometer has a laser light source 211 such as a violet laser diode.

Light from the white light source 204 is directed via a condenser lens 205, pinhole aperture 206 and collimation lens 207 to an acousto-optic tuneable filter (AOTF) 208 that enables selection of a specific wavelength. Light output by the AOTF is directed to a first coupling element 209 in the form of a dichroic beam splitter. Light from the laser source 211 is directed to the coupling element 209 via a lens 240.

Light is directed from the coupling element 209 via lens 210 to an input 232 of a fibre optic coupling 230 which couples to the interferometer section 202. Light from an output 231 of the fibre optic coupling is supplied via lens 225 to a coupling element or beam splitter 250 which directs light along a reference path RP towards a reference surface, generally a reference mirror, 221 and along a sample path SP towards a surface 10' of a sample 10. Light directed along the sample path is focussed onto the sample surface 10' by lens 224 and light directed along the reference path is focussed onto the reference surface 12 by lens 222. Light reflected by the sample surface 10' returns along the sample path via lens 224 to the coupling element 250 while light reflected by the reference surface 221 returns along the reference path via lens 222 to the coupling element 250. The light reflected by the sample surface and the light reflected by the reference surface interfere.

A lens 223 focusses the measurement interference signal or interferogram onto a high speed CCD camera 216 via a dichroic beam splitter 217. The dichroic beam splitter 217 directs the reference interference signal or interferogram to a photodetector 218. The output of the photodetector 218 is coupled to a PID (proportional-differential-integral) controller 219 which controls a PZT 220 mounted to the reference surface 221.

The camera 216 is coupled to a frame grabber 212 which provides measurement interferogram frame data to a computer 213. The computer 213 is coupled via a DAQ card 214 to an AOTF driver 215.

The light source section 201 is separated from the interferometry section 202 to reduce the thermal effects that may otherwise have been introduced to the interferometry section 202 by heat generated during operation of the white light or broadband light source 204. This is achieved by a fibre optic coupling.

In operation of the apparatus shown in FIG. 9, the white light source 204 is focused and collimated and filtered by the AOTF 208 to provide a selected wavelength. The filtered light source is then coupled into the optical fibre 230. The output of the laser light source 211 for the reference interferometer is also collimated and coupled into the optical fibre 230 through the dichroic beam splitter 209.

As in the earlier examples, the interferometer section provides two Linnik interferometers that share common optical path in this interferometer section: the main interferometer and the reference interferometer. The measurement interferometer illuminated by light from the white light source filtered by the AOTF is used to acquire three-dimensional surface height data for a region of the sample, possibly in real time. The reference interferometer illuminated by the laser diode is used to monitor and compensate for environmental noise, e.g. temperature drift, mechanical vibration and air turbulence. As the two interferometers suffer similar environmental noise, the measurement interferometer will be capable of measuring surface information once the reference interferometer is "locked" into an environmental noise compensation mode. The AOTF is implemented to select the light wavelength to illuminate the main interferometer so that only that specific wavelength of light will pass through the AOTF and generate an interferogram and detected by the video camera.

The control section 203 in FIG. 9 includes frame grabber 212, a high performance computer (PC) 213, a GPU card (not shown in the Figure), DAQ card 214 and AOTF driver 215. The PC 213 drives the AOTF driver 215 to select the wavelength that passes through the AOTF device. Frame grabber grabs the corresponding images representing the interferograms detected by the CCD camera and these are processed by the GPU. The selected wavelength is thus altered as discussed above to produce different wavelength interferograms and surface topography can be calculated in real time by analysing these interferograms as described above.

Figure 10:
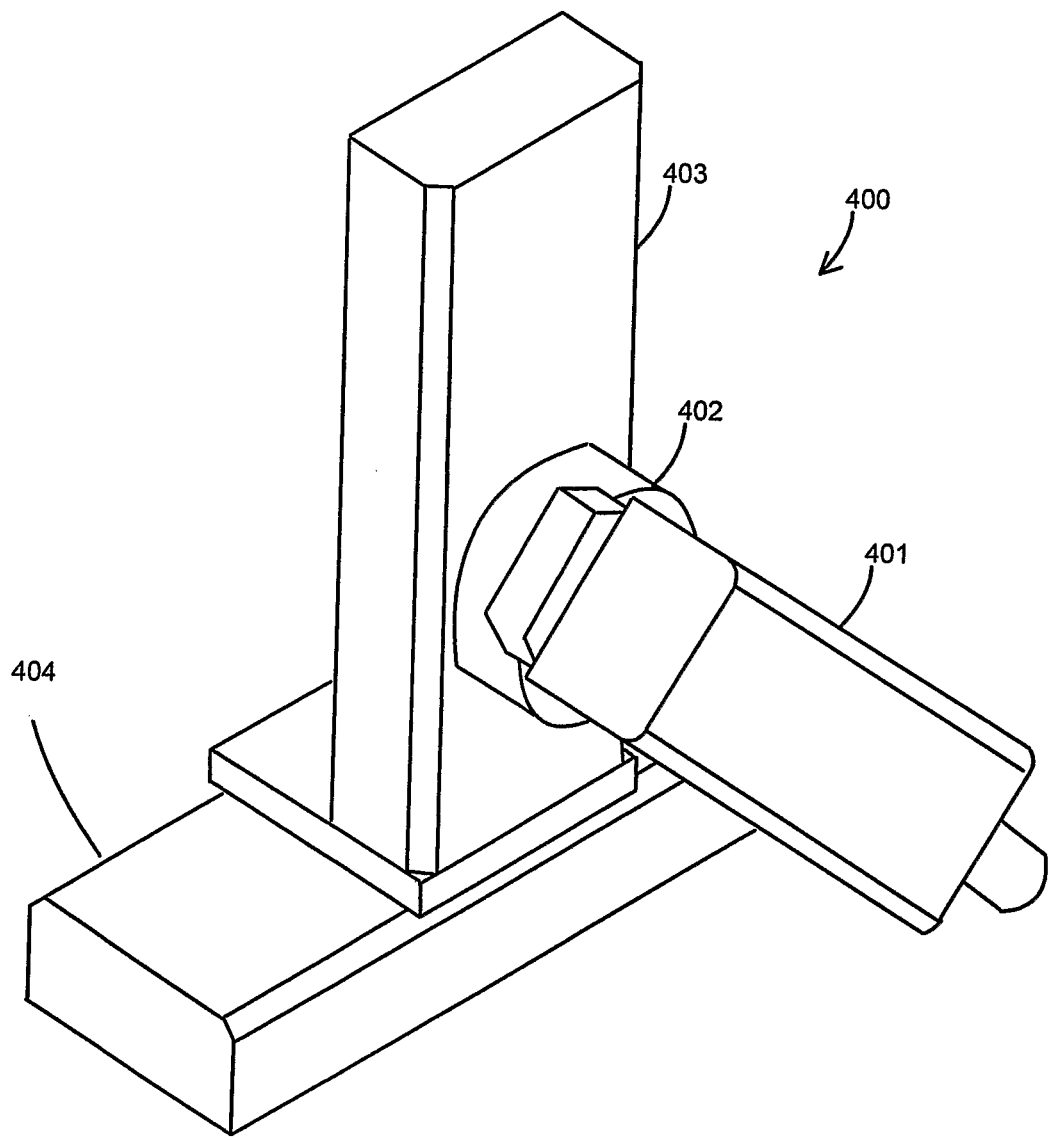
FIG. 10 shows a simplified side view of another example of a metrological instrument in the form of a surface characteristic determining apparatus, embodying the present invention.

FIG. 10 shows a simplified side view of another example of a metrological instrument in the form of a surface characteristic determining apparatus, embodying the present invention. In this example, an interferometer system 401 comprising for example the interferometer section 202 of FIG. 9 or the corresponding components of FIG. 1b, is mounted via a goniometer 402 to a Z axis column 403 itself mounted upon an X, Y stage 404. The interferometer system 401 may be rotated by means of the goniometer to direct it at a sample (not shown) to be measured, thereby enabling in-line measurement on a machine tool. The goniometer 402 may be mounted to the Z axis column 403 by a carriage that enables the vertical position of the interferometer system to be adjusted. The X and/or Y position of the interferometer system may be adjusted by the X, Y stage 404 in a manner similar to that discussed above with reference to FIG. 2. As in the examples described above the light sources could be remotely located. The control system is not shown in FIG. 9 but I may be similar to that described with reference to FIG. 9 or may be provided by the functionality described with reference to FIGS. 1a, 1a and 3.

As described above, in each of the examples, a reference interferometer illuminated by a stabilised laser diode is used to monitor and compensate for environmental noise, e.g. temperature drift, mechanical vibration and air turbulence As the two interferometers suffer similar environmental noise, the measurement interferometer will be capable of measuring surface information once the reference interferometer is 'locked' into compensation mode.

The absolute optical path difference of the interferometer is determined by calculating the ratio of phase change over the change of the optical angular wave number. A zero crossing algorithm could be used to detect the integral period of phase change. Although effective, a zero crossing algorithm may not be accurate enough in practice if only a proportion of the captured image frames are utilised and the height resolution may then be limited to several tens of nanometers. Different phase calculation methods may be used as discussed above and a selection of appropriate pre-filtering parameters and a pseudo phase shifting algorithm may be used to find the appropriate phase shifting value and steps that are the least sensitive to phase-shift error.

The signal processing and control circuitry may be implemented in any appropriate manner using general-purpose computers, DSPs, microcontrollers, GPIB, CPU, GPU and so on alone or in any appropriate combination. Control may be hardwired or software driven depending upon the circumstances and requirements. As mentioned above, it may be advantageous to use a GPU (Graphics Processing Unit) rather than a CPU to process the large amount of captured image data because a GPU can process the data for different image pixels in parallel unlike CPUs which generally process images pixel-by-pixel, so that using GPU technology should greatly reduce the processing time.

Embodiments provide a surface measurement technique with active noise control that utilizes spectral scanning interferometry. Nanometer accuracy surface measurement results have been obtained. There is no need for optical path scanning as in white-light vertical scanning interferometry. Data acquisition times of less than 1 second may be achievable depending upon the image capturing sensor used. CCD cameras are described above but CMOS cameras could also be used. Parallel processing techniques, for example using a GPU, may improve the data processing speed up to 100 times at an affordable price.

As described above, a PZT is used to control the position of the reference mirror. As another possibility, it may be possible to use an electro-optic modulator (that is a device comprising a material such as lithium niobate that has a refractive index that is a function of applied voltage) in the reference path to control the reference path length/phase to compensate for environmental effects. Because of its rapid response times, use of an EOM may mean that higher frequency environmental effects may be compensated for than by physically moving the reference mirror.

In each of the examples described above, the sample may be mounted on a sample support. As another possibility, the interferometer system may be mounted in a probe head which may be suspended on a support or gantry opposed to the sample surface. The latter may facilitate in-situ sample surface measurements where the surface is part of a larger component or assembly, for example.

As described above, the wavelength selection by the AOTF controller is on a step-by-step basis. As another possibility, the wavelength selection by the AOTF controller may be continuous and the timing of measurements effected by controlling the activation of the image capture device or sensor detector or the storage of measurement signal (interferogram) data by the phase determiner 18 (FIG. 1a) or frame grabber. Other wavelength selection devices could be used, for example a tuneable laser.

The optical fibre coupling described with reference to FIG. 9 could be used in any of the other examples. For example in FIG. 2, 1d may provide an optical fibre coupling between the interferometer section I and the light source section which may be provided in a separate housing 1e which, as shown in FIG. 2, can be mounted on a work surface WS or may be even more remote. The signal processing and control circuitry 3 may be close by or remote from the optical system and may or may not comprise a single entity.

Although Linnik interferometers have been described above, other appropriate interferometers may be used.

In an embodiment, a wavelength selector 5 selects a wavelength of a broadband light source 4. A light director BS1, BS2 directs light from the wavelength selector along a measurement path towards a region of a sample surface and along a reference path towards a reference surface such that light reflected by the region of the sample surface and light reflected by the reference surface interfere to produce an interferogram. A controller 20 controls the wavelength selector to change the wavelength selected by the wavelength selector. A recorder 63 records successive images, each image representing the interferogram produced by a respective one of the wavelengths selected by the wavelength selector. A data processor 18, 180 processes the recorded images to produce at least one of a surface profile and a surface height map of at least a part of the sample surface. The reference path may be controlled to compensate for environmental effects such as vibration, thermal effects and air turbulence. The data processor may use a Graphics Processing Unit (GPU) to enable pixel data to be processed in parallel.

It will be appreciated that the position of and presence of the various lenses shown in the Figures may be a matter of design choice and that alternative scenarios may be possible.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention.

The invention claimed is:

1. Apparatus for determining information relating to a sample surface, the apparatus comprising:
   a wavelength selector to select a single wavelength of a broadband light source;
   a light director to direct light from the wavelength selector along a measurement path towards a region of a surface of a sample and along a reference path towards a reference surface such that light reflected by the region of the sample surface and light reflected by the reference surface interfere to produce an interferogram of the region of the surface of the sample;
   a controller to control the wavelength selector to change the single wavelength selected by the wavelength selector;
   a recorder to record successive images consisting of the surface of the sample, each of the successive images representing the interferogram produced by a respective one of each of the single wavelengths selected by the wavelength selector;
   a data processor configured to process the successive images of the surface of the sample recorded by the recorder to produce at least one of a surface profile and a surface height map of the region of the surface of the sample; and the wavelength selector comprises an acousto-optic tuneable filter (AOTF).

2. The apparatus according to claim 1, further comprising at least one of:
a path controller to control at least the reference path length to compensate for phase variation due to environmental effects, or
a path controller to move at least one of the sample surface and the reference surface to control at least the reference path length to compensate for phase variation due to environmental effects.

3. The apparatus according to claim 2, wherein the path controller comprises the light director which is arranged also to direct light from a further light source along the measurement path towards a region of a surface of a sample and along the reference path towards a reference surface such that light from the further light source reflected by the region of the sample surface and by the reference surface interfere and the path controller further comprises a detector to detect the interference produced by light from the further light source and to provide an output, a mover to move at least one of the reference surface and the sample surface, and a mover controller to control the mover in accordance with the output of the detector.

4. The apparatus according to claim 3, wherein at least one of:
the further light source comprises a coherent light source,
the path controller comprises a piezo-electric controller, or
the mover comprises a piezoelectric mover.

5. The apparatus according to claim 1, wherein at least one of:
the light director comprises a beam splitter, or
the light director comprises a Linnik interferometer.

6. The apparatus according to claim 2, wherein the light director provides a first interferometer for the broadband light source and a second interferometer for a further light source, the first and second interferometers sharing an optical path comprising at least part of the reference and measurement paths.

7. The apparatus according to claim 6, wherein the first and second interferometers comprise Linnik interferometers.

8. The apparatus according to claim 1, wherein at least one of:
the data processor comprises at least one Graphics Processing Unit (GPU) to process the interferograms, or
the apparatus further comprises a fibre optic coupling to couple the light source or light sources to the light director.

9. The apparatus according to claim 1, wherein the recorder comprises an image sensor having an array of sensing pixels each of which is arranged to sense light from a corresponding surface area or surface pixel of the sample surface.

10. The apparatus according to claim 9, wherein at least one of:
the image sensor comprises a CCD or CMOS camera, the data processor is arranged to process the interferograms to produce data representing a surface height of at least some of the surface pixels imaged by the recorder, or
the data processor is arranged to process the interferograms to produce data representing a surface height of a 1D array or sample of the surface pixels imaged by the recorder to produce a surface profile representing the relative heights of those surface pixels.

11. The apparatus according to claim 9, wherein the data processor is arranged to process the interferograms to produce data representing a surface height of a 2D array or sample of the surface pixels imaged by the recorder to produce a surface height map representing the relative heights of those surface pixels.

12. An apparatus for determining information relating to a sample surface, the apparatus comprising:
an measurement interferometer to direct light from a broadband light source along a measurement path towards a region of a sample surface and along a reference path towards a reference surface and to cause light reflected by the region of the sample surface and light reflected by the reference surface to interfere to produce an interferogram of the region of the surface of the sample;
a reference interferometer having a reference light source, the measurement and reference interferometers sharing a common optical path comprising at least part of the reference path, the reference interferometer producing an output representing interference between light from the reference light source reflected by the sample surface and by the reference surface;
a wavelength selector to select a single wavelength of the broadband light source;
a recorder to record successive images consisting of the surface of the sample, each of the successive images representing the interferogram produced by a respective one of each of the single successive wavelengths selected by the wavelength selector;
a data processor configured to process the successive images of the surface of the sample recorded by the recorder to produce at least one of a surface profile and a surface height map of the region of the surface of the sample;
a detector to detect the output of the reference interferometer;
a path length controller to control the reference path on the basis of the output detected by the detector; and
wherein the wavelength selector comprises an acousto-optic tuneable filter (AOTF).

13. The apparatus according to claim 12, wherein at least one of:
the path controller is arranged to move the reference surface to control the reference path length to compensate for phase variation due to environmental effects, or
the path controller comprises a piezoelectric device coupled to the reference surface and a piezoelectric controller to control the piezoelectric device in accordance with the output of the detector.

14. The apparatus according to claim 12, further comprising a controller to control the wavelength selector to change the wavelength selected by the wavelength selector, the recorder being arranged to record successive images, each image representing the interferogram produced by a respective one of the wavelengths selected by the wavelength selector and the data processor being arranged to process the successive images to produce at least one of a surface profile and a surface height map of at least part of a region of the sample surface.

15. The apparatus according to claim 12, wherein the interferometers comprise Linnik interferometers.

16. The apparatus according to claim 12, wherein the data processor comprises at least one Graphics Processing Unit (GPU) to process the interferograms.

17. The apparatus according to claim 12, further comprising a fibre optic coupling to couple the light sources to the light director.

18. The apparatus according to claim 12, wherein the recorder comprises an image sensor having an array of sensing pixels each of which is arranged to sense light from a corresponding surface region or surface pixel of the sample surface.

19. An apparatus for determining information relating to a sample surface, the apparatus comprising an interferometric measurement system to produce interferogram image data sets consisting of the sample surface, each interferogram image data set representing a respective and successive interferogram of the sample surface, each interferogram produced by a respective different one of each of the single successive wavelengths selected by a wavelength selector, each data set comprising pixel image data for each of an array or sample set of surface pixels of the sample surface; and a data processor configured to process the successive interferograms of the sample surface to produce at least one of surface profile data and surface height map data of the sample surface, the data processor comprising a graphics processing unit capable of processing the pixel data for different surface pixels in parallel.

\* \* \* \* \*